3,631,016
PROCESS FOR IMPROVING THE STABILITY OF CIS-1,4-POLYISOPRENE VULCANISATES

Josef Witte, Cologne-Stammheim, Friedrich Haas, Cologne-Buchheim, and Gottfried Pampus, Egon Kuntz, and Nikolaus Schon, Leverkusen, Germany, assignors to Farbenfabriken Bayer Aktiengesellschaft, Leverkusen, Germany
No Drawing. Continuation of application Ser. No. 771,663, Oct. 29, 1968. This application July 20, 1970, Ser. No. 64,023
Int. Cl. C08d 3/12, 5/02
U.S. Cl. 260—94.7 N     3 Claims

ABSTRACT OF THE DISCLOSURE

Process for improving the stability of cis-1,4-polyisoprene vulcanisates by inactivating a catalyst containing solution of polyisoprene in an organic solvent with a mixture comprising a lower aliphatic alcohol, a conventional stabiliser and a small quantity of an aliphatic or cycloaliphatic secondary amine whose alkyl or cycloalkyl radicals together contain at least 10 carbon atoms.

---

This application is a continuation of application Ser. No. 771,663 filed Oct. 29, 1968 and now abandoned.

It is known that isoprene can be polymerised with organo-metallic mixed catalyst of the Ziegler type, to give a product with a structure resembling that of natural rubber and having cis-1,4-linkages. Vulcanisates of these polyisoprenes, however, differ from corresponding natural rubber vulcanisates so far as their properties in critical fields of application are concerned. Natural rubber is superior to commercial cis-1,4-polyisoprene in its cross-link yield and cross-link structure, as reflected in improved tensile strength and structural strength of the vulcanisates, in combination with higher strain values. This applies in particular to unfilled or weakly filled vulcanisates containing weak strengtheners, for example MT-carbon blacks, and is less pronounced but nevertheless still recognisable in HAF- and ISAF carbon black-mixtures of tread quality for vehicle tyres.

The polymerisation of isoprene with organometallic mixed catalysts, for example $Al(i-C_4H_9)_3/TiCl_4$, is known. The reaction is usually carried out in solution. For example, the following procedure may be adopted:

The catalyst is added to an 8 to 30% by weight solution of isoprene in an aliphatic or aromatic hydrocarbon in the absence of oxygen and moisture. Suitable solvents include, for example, pentane, hexane, cyclohexane, benzene and toluene. Mixtures of aluminium trialkyls, optionally in conjunction with their etherates and titanium tetrachloride may, for example, be used as the catalysts. Polymerisation may be carried out at temperatures from about $-20$ to $+80°$ C. After the required monomer conversion rate, for example 90% or more, has been attained, the catalyst can be inactivated by the addition of suitable substances, for example alcohols such as methanol or ethanol. Following the addition of suitable stabilisers, for example 2,6-di-tert.-butyl-4-methyl phenol; 2,2'-dihydroxy - 3,3' - di - tert.-butyl-5,5'-dimethyl diphenyl methane or phenyl-$\beta$-naphthylamine, the polymer may be isolated from the solution by the addition of a precipitant, for example ethanol or acetone. On a commercial scale, the polyisoprene is usually recovered from the hydrocarbon solution by steam distillation (stripping). The rubber which is obtained in the form of crumbs is dried in a vacuum cabinet, either on a plate conveyor or by means of a screw.

It has now been found that cis-1,4-polyisoprene with improved properties can be obtained by inactivating a mixed-catalyst-containing solution of polyisoprene in an organic solvent, by means of a mixture of a lower aliphatic alcohol, a conventional stabiliser and a small quantity of an aliphatic or cycloaliphatic secondary amine, whose alkyl or cycloalkyl radicals together contain at least 10 carbon atoms.

Solutions of polyisoprene in organic solvents containing mixed catalysts include, in particular, the solutions referred to earlier on, of the kind that are directly formed during polymerisation. The inactivating agent according to the invention preferably comprises a lower aliphatic alcohol, for example methanol or ethanol, a conventioanl stabiliser and a small quantity of an aliphatic or cycloaliphatic amine which together are dissolved in an organic solvent, preferably the solvent of the polyisoprene solution. Suitable amines include in particular aliphatic or cycloaliphatic amines containing one fairly long chain and one shorter alkyl or cycloalkyl radical. Derivatives of methylamine in which one of the hydrogen atoms is replaced by a linear or branched alkyl radical with from 9 to 24 carbon atoms, are particularly suitable. Examples of suitable amines include di-2-ethylhexylamine, dicyclohexylamine and N-stearyl methylamine. The amine is preferably used in a quantity of from 0.2 to 0.7% by weight, based on solid rubber.

The lower aliphatic alcohols employed, for example methanol or ethanol, are generally used in a quantity of from 0.2 to 5% by weight, based on rubber.

Examples of suitable stabilisers, which are generally used in a quantity of from 0.1 to 2% by weight, based on rubber, include 2,6-di-tert.-butyl-4-methylphenol; 2,2'-dihydroxy-3,3'-di-tert.-butyl-5,5'-dimethyl diphenyl methane and phenyl-$\beta$-naphthylamine.

The three compounds are usually added to the polyisoprene solution still containing an active catalyst in as concentrated as possible (for example, with a concentration of from 2 to 25% by weight) a solution in an inert solvent. The stabiliser may also be subsequently included in the mixture separately from the other compounds.

The resulting solution is worked up in the usual way, for example by distillation with steam.

This method of inactivating the catalyst gives polyisoprene whose vulcanisates show distinctly improved properties and a reduced tendency towards reversion.

The improvement in the stability of the vulcanisate, i.e. the reduction of its tendency towards reversion, occurs above all in the critical, i.e. unfilled or inactively filled mixtures, and is also apparent, though not quite so noticeably, in vulcanisates containing ISAF- or HAF-carbon black. Further improvements are obtained in the scorch time and above all in the optimum values for tensile strength and structural strength, coupled with high strain values, and in the resistance to reversion in every vulcanisate ageing process, for example starting with the high temperature vulcanisation of highly dimensioned products and extending up to dynamic permanent stress, for example in tyres for heavy lorries.

The cis-1,4-polyisoprene rubbers obtained by the process according to the invention come more closely to the properties of good natural rubbers (RSS N.1) than commercial cis-1,4-polyisoprenes.

The polyisoprenes produced in accordance with the invention may be used for any purpose for which high quality rubber is required, i.e. in particular for rubber products subject to high dynamic stressing, for example lorry tyres.

EXAMPLE 1

Polymerisation

Isoprene was polymerised in 10% by weight solution in n-hexane in the presence of an organometallic mixed catalyst based on $TiCl_4$ and $Al(C_2H_5)_3$.

Working-up

The polymerization mixture (conversion 93%=93% solids content) was divided. One part (Polymer A) was inactivated and stabilised with a mixture of 10% by weight of hexane, 2.5% by weight of ethanol and 1% by weight of 2,6-di-tert.-butyl-4-methylphenol (based on polyisoprene). The second part of the mixture (Polymer B) was inactivated and stabilised with a mixture of 10% by weight of hexane, 2.5% by weight of ethanol, 0.5% by weight of N-methylstearylamine and 1% by weight of 2,6-di-tert.-butyl-4-methtylphenol (based on polyisoprene).

In order to test and assess the vulcanisation properties and the vulcanisates, the polyisoprene solutions were worked-up by steam distillation of the solvent after they had been inactivated and stabilised. The crumbs of rubber that were formed were dried in vacuo at 30° C.

In the vulcanising tests, polymers A and B were compared with a commercial product prepared with the assistance of a titanium catalyst (referred to as the commercial product) in a filler-free mixture (gum stock) and thermal carbon black MT-mixture and in the HAF carbon black mixture additionally with natural rubber.

Details of the tests (1) Gum stock.—Examination of the vulcanisates of the gum stock is critical. The vulcanisation behaviour of the pure polymers is assessed here unfalsified by fillers and other mixture components, because only those chemicals that are absolutely necessary for crosslinking are present. The results of the test throw some light, for example, upon the crosslink yield that can be obtained and upon the uniformity of the cellular structure.

| Formulation | Parts by weight | Processing |
|---|---|---|
| Rubber | 100.0 | Roller 400×200, temp. 40° C., rotational speed 24 r.p.m., friction 1:1.2, mixing time 7 min. |
| ZnO | 2.5 | |
| Stearic acid | 1.0 | |
| Sulphur | 2.0 | |
| Dibenzothiazyl disulphide | 0.7 | |
| Diphenyl guanidine | 0.3 | |

Mixture containing thermal carbon black MT

This mixture, with its inactive carbon black filling (weakly acid), and weakly basic accelerator system, makes it relatively easy to differentiate between the effects of the various inactivating and stabilising agents. The inactive filler does not disguise the differences in the properties, as is frequently the case, for example, with active fillers from the HAF or ISAF group. This test mixture responds particularly critically to changes in the quality of the polymers, owing to the well-balanced neutral adjustment of carbon black and accelerator. Both the level and reversion of the tensile strength and structural strength characterise the quality of the vulcanisate particularly clearly.

| Formulation | Parts by weight | Processing |
|---|---|---|
| Rubber | 100.0 | Roller 400×200, m./m., temp. 40° C., friction 1:1.2., r.p.m. 24, mixing time 22 min. |
| ZnO | 5.0 | |
| Stearic acid | 2.0 | |
| Thermal carbon black MT | 30.0 | |
| Sulphur | 2.5 | |
| Dibenzothiazyldisulphide | 0.5 | |
| Diphenylguanidine | 0.2 | |

Tread quality containing HAF carbon black

The property pattern of any general purpose rubber would not be complete without its test with active carbon blacks in mixtures substantially of tread quality of a lorry tyre. These tests are intended to produce peak values for tensile strength and structural strength, accompanied by high strain and hardness values.

| Formulation | Parts by weight | Processing |
|---|---|---|
| Rubber | 100.0 | Temp. 40° C., rotational speed 40 r.p.m., mixing sequence rubber 0 mins., everthing except sulphur and accelerator 1 min., clean shaft 3 mins., empty 5 mins. benzothiazyl-cyclohexyl sulphenamide and sulphur are mixed in on the Batchoff Roller. |
| ZnO | 5.0 | |
| Stearic acid | 2.0 | |
| HAF carbon black | 50.0 | |
| Highly aromatic mineral oil | 10.0 | |
| N-phenyl-N'-isopropyl-p-phenylene diamine | 1.0 | |
| Phenyl-α-naphthylamine | 1.0 | |
| Sulphur | 2.5 | |
| Benzothiazyl-cyclohexyl-sulphenamide | 0.5 | |

TEST FORMULA: THERMAL CARBON BLACK MT

| Product | ML 4'/100° rubber mixture | Defo (80°) rubber | Mooney-scorch 5 ME 120° | Vulc. 3 atms., mins. | F, kp/cm.$^2$ | D, percent | Modulus 300% | Modulus 500% | Hardness, 23/75° | Elast., 23/75° | Str., kp/4 mm. |
|---|---|---|---|---|---|---|---|---|---|---|---|
| Commercial product | 86 | 20 | 1,375/30 | 23' | 10 | 175 | 755 | 21 | 56 | 41/43 | 64/71 | 15 |
| | | | | | 20 | 185 | 650 | 37 | 101 | 49/50 | 70/76 | 13 |
| | | | | | 30 | 160 | 615 | 35 | 99 | 49/50 | 70/78 | 11 |
| | | | | | 45 | 163 | 635 | 35 | 93 | 48/49 | 68/76 | 10 |
| | | | | | 60 | 155 | 640 | 32 | 85 | 47/48 | 67/74 | 7 |
| Polymer A | 85 | 20 | 1,275/26 | 45' | 10 | 100 | 780 | 12 | 37 | 32/30 | 60/60 | 6 |
| | | | | | 20 | 180 | 660 | 30 | 90 | 47/48 | 71/71 | 16 |
| | | | | | 30 | 160 | 625 | 28 | 87 | 47/47 | 70/71 | 11 |
| | | | | | 45 | 150 | 650 | 25 | 83 | 45/45 | 69/71 | 6 |
| | | | | | 60 | 145 | 655 | 23 | 78 | 45/46 | 68/70 | 4 |
| Polymer B | 82 | 19 | 1,325/33 | 31' | 10 | 205 | 750 | 27 | 77 | 44/45 | 69/73 | 22 |
| | | | | | 20 | 195 | 650 | 39 | 115 | 48/50 | 72/77 | 20 |
| | | | | | 30 | 192 | 650 | 37 | 112 | 48/49 | 72/77 | 15 |
| | | | | | 45 | 180 | 640 | 36 | 107 | 46/48 | 71/76 | 12 |
| | | | | | 60 | 170 | 650 | 32 | 96 | 45/47 | 68/74 | 10 |

TEST FORMULA: GUM STOCK

| Product | ML 4'/100° rubber mixture | Defo (80°) rubber | Mooney-scorch 5 ME 120° | Vulc. 3 atms., mins. | F, kp/cm.$^2$ | D, percent | Modulus 300% | Modulus 500% | Hardness, 23/75° | Elast., 23/75° | Str., kp/4 mm. |
|---|---|---|---|---|---|---|---|---|---|---|---|
| Commercial product | 86 | 36 | 1,375/30 | 19' | 10 | 163 | 830 | 12 | 21 | 37/37 | 80/75 | 20 |
| | | | | | 20 | 180 | 775 | 13 | 29 | 38/40 | 75/80 | 21 |
| | | | | | 30 | 155 | 750 | 13 | 28 | 38/40 | 74/77 | 20 |
| | | | | | 45 | 140 | 655 | 13 | 28 | 38/39 | 74/77 | 19 |
| | | | | | 60 | 140 | 860 | 12 | 24 | 38/38 | 71/77 | 18 |
| Polymer A | 85 | 35 | 1,275/26 | 33' | 10 | 110 | 855 | 10 | 16 | 32/34 | 70/77 | 18 |
| | | | | | 20 | 170 | 775 | 12 | 27 | 37/39 | 75/80 | 21 |
| | | | | | 30 | 195 | 800 | 14 | 27 | 37/39 | 74/78 | 20 |
| | | | | | 45 | 155 | 785 | 13 | 24 | 37/38 | 75/77 | 21 |
| | | | | | 60 | 150 | 795 | 11 | 24 | 36/78 | 73/75 | 18 |
| Polymer B | 81 | 35 | 1,325/33 | 23' | 10 | 155 | 815 | 12 | 23 | 37/37 | 76/77 | 22 |
| | | | | | 20 | 208 | 775 | 17 | 33 | 40/40 | 76/77 | 24 |
| | | | | | 30 | 180 | 760 | 17 | 34 | 40/40 | 77/77 | 23 |
| | | | | | 45 | 175 | 775 | 15 | 30 | 39/39 | 75/76 | 20 |
| | | | | | 60 | 175 | 790 | 13 | 28 | 39/38 | 72/76 | 19 |

TEST FORMULA: HAF CARBON BLACK

| Product | ML 4'/100° rubber mixture | Defo (80°) rubber mixture | Mooney-scorch 5 ME 120° | Vulc. 3 atms., mins. | F, kp/cm.² | D, percent | Modulus 300% | Modulus 500% | Hardness, 23/75° | Elast., 23/75° | Str., kp/4 mm. |
|---|---|---|---|---|---|---|---|---|---|---|---|
| Natural rubber | 89 | 54 | 300/41 825/11 | 37' | 10 | 100 | 485 | 45 | 101 | 46/38 | 39/38 | 12 |
| | | | | | 20 | 192 | 535 | 83 | 174 | 54/52 | 42/49 | 36 |
| | | | | | 30 | 197 | 525 | 89 | 182 | 56/54 | 42/49 | 38 |
| | | | | | 45 | 187 | 520 | 88 | 184 | 56/53 | 41/49 | 34 |
| | | | | | 60 | 179 | 515 | 78 | 172 | 55/52 | 41/47 | 32 |
| | | | | | 90 | 181 | 500 | 83 | 176 | 54/51 | 40/46 | 32 |
| Commercial product | 86 | 57 | 1,375/30 825/11 | 41' | 10 | 47 | 530 | 21 | 44 | 35/32 | 34/33 | 6 |
| | | | | | 20 | 186 | 570 | 76 | 156 | 54/53 | 41/48 | 36 |
| | | | | | 30 | 195 | 560 | 83 | 169 | 56/55 | 41/50 | 34 |
| | | | | | 45 | 181 | 545 | 78 | 159 | 56/54 | 41/48 | 27 |
| | | | | | 60 | 166 | 535 | 70 | 151 | 55/53 | 40/47 | 24 |
| | | | | | 90 | 166 | 545 | 70 | 148 | 52/53 | 39/47 | 25 |
| Polymer A | 85 | 50 | 1,275/26 725/11 | 45' | 10 | 10 | 720 | 5 | 25 | | | 32 |
| | | | | | 20 | 170 | 660 | 58 | 140 | 51/50 | 42/48 | 35 |
| | | | | | 30 | 195 | 585 | 81 | 165 | 55/54 | 43/49 | 30 |
| | | | | | 45 | 185 | 550 | 75 | 145 | 54/52 | 42/50 | 24 |
| | | | | | 60 | 170 | 535 | 60 | 145 | 54/52 | 41/48 | 100 |
| | | | | | 90 | 160 | 330 | 60 | 135 | 53/51 | 41/47 | |
| Polymer B | 82 | 52 | 1,325/33 750/12 | 36' | 10 | 29 | 505 | 10 | 23 | 32/38 | 32/28 | 6 |
| | | | | | 20 | 210 | 575 | 81 | 172 | 54/53 | 44/52 | 38 |
| | | | | | 30 | 210 | 550 | 91 | 187 | 55/54 | 44/54 | 38 |
| | | | | | 45 | 200 | 540 | 86 | 177 | 56/54 | 54/44 | 35 |
| | | | | | 60 | 185 | 535 | 78 | 167 | 55/52 | 43/49 | 30 |
| | | | | | 90 | 175 | 540 | 7 | 168 | 55/50 | 42/47 | 26 |

TESTING THE OPTIMAL HEATING STAGES

[Comparison between NR, a commercial product, Polymer A and Polymer B]

TEST FORMULATION: HAF-CARBON BLACK MIXTURE

| Crude Mixture | Natural rubber | Commercial product | Polymer A | Polymer B |
|---|---|---|---|---|
| ML 4' (100° C.) | 54 | 57 | 55 | 52 |
| Defo (80° C.) | 825/11 | 825/11 | 1,075/14 | 800/12 |
| Mooney Scorch (120° C.) 5 ME | 37 | 41 | 45 | 36 |
| Relaxation (1%) | 38.8 | 24.0 | 24.0 | 28.0 |
| Tackmeter (stickiness) | 846 | 912 | 600 | 880 |
| Optimal heating: 30'/3.0 atms.: | | | | |
| DIN-abrasion: | | | | |
| 40 grade emery | 176 | 162 | 172 | 167 |
| 60 grade emery | 102 | 93 | 124 | 113 |
| Skid-resistance: wet | 53 | 52 | 52.3 | 52.5 |
| De Mattia (bends=×10³): | | | | |
| Grazing, 50% failure | 95 | 45 | 70 | 83 |
| Grazing, 100% failure | 144 | 71 | 85 | 132 |
| Crack growth: | | | | |
| 2-4 m/m | 61 | 37 | 40 | 44 |
| 4-8 m/m | 118 | 68 | 67 | 84 |
| 8-12 m/m | 161 | 88 | 85 | 107 |
| Compression Set, Meth. B ASTM: | | | | |
| 70 hr./RT | 9.1 | 5.5 | 4.7 | 4.9 |
| 22 hr/70° | 31.3 | 25.1 | 29.4 | 23.5 |
| 70 hr./100° | 65.5 | 62.2 | 60.1 | 59.4 |
| Ball disintegration: | | | | |
| Useful life (revolution) | 19.370 | 14.580 | 13.535 | 17.480 |
| Temperature (° C. with revolution) | 178/7,830 | 183/6,680 | 185/6,680 | 181/756 |
| Goodrich Plexometer 0.0875 inch: | | | | |
| T above RT after: | | | | |
| 10 mins | 27.5° | 30.0° | 29.0° | 26.0° |
| 25 mins | 33.5° | 36.0° | 34.5° | 31.0° |
| 60 mins | 36.0° | 38.0° | 36.0° | 32.0° |
| Flow at RT in percent after: | | | | |
| 10 mins | −2.4 | +1.0 | +1.2 | +1.4 |
| 25 mins | −3.5 | +0.5 | +0.2 | +0.6 |
| 60 mins | −5.7 | −1.2 | −1.5 | −0.8 |
| Δ T above 100° after: | | | | |
| 10 mins | 15.0° | 14.0° | 15.0° | 12.5° |
| 25 mins | 20.0° | 18.0° | 19.0° | 15.0° |
| 60 mins | 33.0° | 32.0° | 39.0° | 19.0° |
| Flow at 100° C. percent after: | | | | |
| 10 mins | −4.1 | −3.0 | −3.8 | −2.0 |
| 25 mins | −9.6 | −7.8 | −9.1 | −6.7 |
| 60 mins | −25.0 | −19.0 | −20.3 | −12.3 |

EXAMPLES 2 TO 8

The effect of secondary amines used according to the invention is compared in the following Examples 2 to 8 with a series of primary and tertiary amines with reference to the example of N-methylstearylamine. The polyisoprene solutions were prepared as in Example 1 and were treated with the following amines in the manner set out in Example 1:

| | Amine | Percent* |
|---|---|---|
| Example: | | |
| 2 | $NH_3$ | 0.035 |
| 3 | $C_3H_7NH_2$ | 0.12 |
| 4 | $C_{18}H_{37}NH_2$ | 0.49 |
| 5 | $(C_2H_5)_2NH$ | 0.15 |
| 6 | $(C_2H_5)_3N$ | 0.20 |
| 7 | $C_{12}H_{25}N(CH_3)_2$ | 0.43 |
| 8 | $C_{18}H_{35}NHCH_3$ | 0.50 |

*All amines are used in equivalent quantities.

The polymers of Examples 2 to 8 were tested for serviceability in the Test Formula containing thermal carbon black MT (Thermax MT®), cf. following table:

TEST FORMULA: THERMAL CARBON BLACK MT

| Example Number | Amine | Vulc. 3 atms., mins. | F, kp/cm.$^2$ | D, percent | Modulus 300% | Modulus 500% | Hardness, 23/75 | Elast., 23/75 | Str., kp/4 mm. |
|---|---|---|---|---|---|---|---|---|---|
| 2 | $NH_3$ | 10 | 90 | 795 | 11 | 29 | 33/34 | 61/60 | 5 |
|  |  | 20 | 157 | 660 | 27 | 77 | 45/46 | 67/71 | 14 |
|  |  | 30 | 150 | 650 | 27 | 77 | 46/46 | 68/71 | 8 |
|  |  | 45 | 144 | 665 | 24 | 71 | 44/45 | 68/71 | 5 |
|  |  | 60 | 135 | 650 | 24 | 69 | 43/42 | 68/70 | 5 |
| 3 | $nC_3H_7NH_2$ | 10 | 175 | 715 | 21 | 67 | 46/46 | 70/71 | 16 |
|  |  | 20 | 154 | 625 | 30 | 88 | 48/49 | 73/71 | 11 |
|  |  | 30 | 157 | 645 | 27 | 83 | 47/47 | 72/71 | 8 |
|  |  | 60 | 155 | 660 | 25 | 79 | 47/47 | 68/69 | 5 |
|  |  | 90 | 158 | 665 | 21 | 69 | 44/45 | 68/69 | 5 |
| 4 | $C_{18}H_{37}NH_2$ | 10 | 165 | 660 | 29 | 88 | 48/49 | 71/70 | 16 |
|  |  | 20 | 140 | 585 | 32 | 96 | 49/50 | 74/73 | 9 |
|  |  | 30 | 147 | 600 | 32 | 93 | 48/49 | 70/69 | 7 |
|  |  | 60 | 146 | 610 | 32 | 91 | 48/48 | 68/69 | 5 |
|  |  | 90 | 135 | 610 | 27 | 83 | 46/47 | 66/68 | 4 |
| 5 | $(C_2H_5)_2NH$ | 10 | 170 | 675 | 24 | 80 | 46/45 | 71/71 | 17 |
|  |  | 20 | 170 | 620 | 35 | 101 | 49/49 | 73/73 | 7 |
|  |  | 30 | 160 | 660 | 35 | 103 | 48/48 | 71/72 | 5 |
|  |  | 60 | 155 | 615 | 29 | 93 | 48/48 | 71/71 | 4 |
|  |  | 90 | 148 | 620 | 27 | 88 | 45/47 | 70/69 | 4 |
| 6 | $(C_2H_5)_3N$ | 10 | 160 | 725 | 19 | 59 | 43/40 | 66/67 | 15 |
|  |  | 20 | 26 | 275 |  |  | 48/48 | 71/71 | 6 |
|  |  | 30 | 20 | 280 | 25 |  | 46/47 | 70/70 | 5 |
|  |  | 60 | 30 | 340 | 25 |  | 45/46 | 66/68 | 4 |
|  |  | 90 | 45 | 405 | 24 |  | 43/45 | 65/67 | 4 |
| 7 | $C_{12}H_{25}N(CH_3)_2$ | 10 | 153 | 755 | 16 | 45 | 44/40 | 66/67 | 15 |
|  |  | 20 | 162 | 655 | 27 | 75 | 48/48 | 70/69 | 13 |
|  |  | 30 | 145 | 625 | 27 | 77 | 47/48 | 67/68 | 11 |
|  |  | 60 | 120 | 615 | 24 | 72 | 47/47 | 65/68 | 7 |
| 8 | $C_{18}H_{37}NHCH_3$ | 10 | 186 | 685 | 27 | 83 | 43/46 | 69/72 | 7 |
|  |  | 20 | 175 | 605 | 40 | 121 | 49/71 | 72/73 | 14 |
|  |  | 30 | 175 | 590 | 41 | 120 | 49/50 | 71/73 | 7 |
|  |  | 45 | 160 | 600 | 37 | 111 | 48/49 | 70/72 | 5 |
|  |  | 60 | 163 | 585 | 37 | 111 | 48/49 | 70/72 | 5 |
|  |  | 90 | 160 | 600 | 32 | 101 | 47/48 | 69/71 | 5 |

Comparison of the vulcanisate data of Examples 2 to 8 shows that N-methylstearylamine (Example 8) provides the most favourable values in regard to the crosslink yield and cellular structure, as reflected in the high level of strength, coupled with high modulus and hardness values. Ammonia (Example 2) and the tertiary amines (Examples 6 and 7) do not provide satisfactory vulcanisates. The crosslink yield is not sufficient either. The primary amines (Examples 3 and 4) and diethyl amine provide slightly better crosslink yields, although they are nowhere near as good as the level of Example 8. Above all, the tendency towards reversion (reduction in strength, strain and hardness values) is too great. Reversion is considerably reduced by N-methylstearylamine (Example 8).

We claim:

1. In a process for producing cis-1,4-polyisoprene by polymerizing isoprene in an aliphatic or aromatic hydrocarbon with a catalyst comprising titanium tetrachloride and aluminum trialkyl or an etherate thereof, the improvement comprising inactivating the catalyst containing solution of cis-1,4-polyisoprene with a mixture of (a) 0.2 to 5% by weight of methanol or ethanol, (b) 0.1 to 2% by weight of a stabilizer and (c) 0.1 to 0.7% by weight of N-methylstearylamine.

2. The process of claim 1 wherein said catalyst is titanium tetrachloride and aluminum triethyl.

3. The process of claim 1 wherein said stabilizer is 2,6-di-tert.-butyl - 4 - methylphenol, 2,2'-dihydroxy-3,3'-di-tert.-butyl-5,5'-dimethyl diphenyl methane or phenyl-β-naphthylamine.

References Cited

UNITED STATES PATENTS

| 3,135,716 | 6/1964 | Uraneck et al. |
| 3,177,165 | 4/1965 | Morris et al. |
| 3,269,997 | 8/1966 | Lyons et al. |
| 3,008,944 | 11/1961 | Wilson. |
| 3,094,514 | 6/1963 | Tucker. |
| 3,424,736 | 1/1965 | Nudenberg. |

JOSEPH L. SCHOFER, Primary Examiner

W. F. HAMROCK, Assistant Examiner

U.S. Cl. X.R.

260—96 R, 94.3, 45.9